Figure 3:
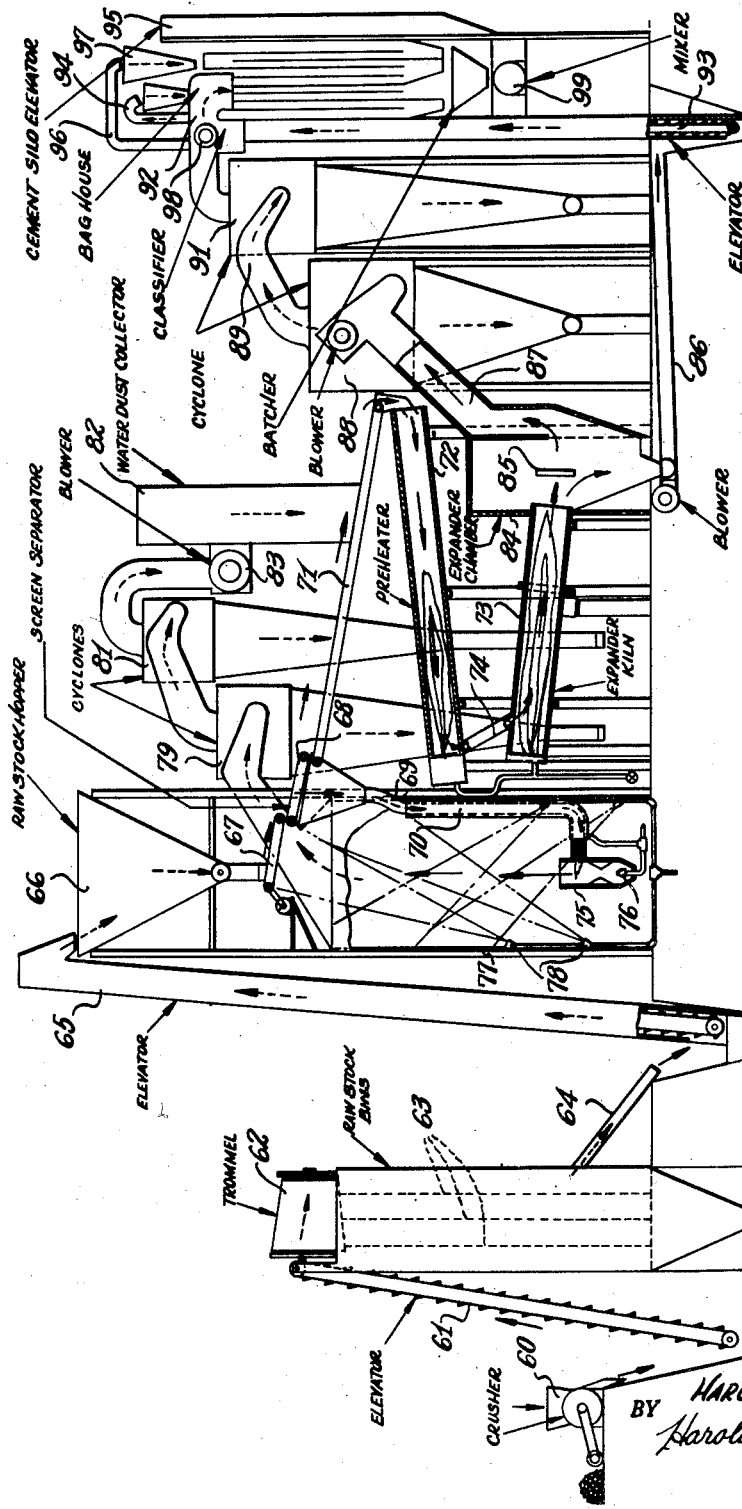

March 28, 1950   H. L. PIERCE   2,501,962
PROCESS FOR EXPANDING EARTH MATERIALS
Filed May 16, 1947   2 Sheets-Sheet 1
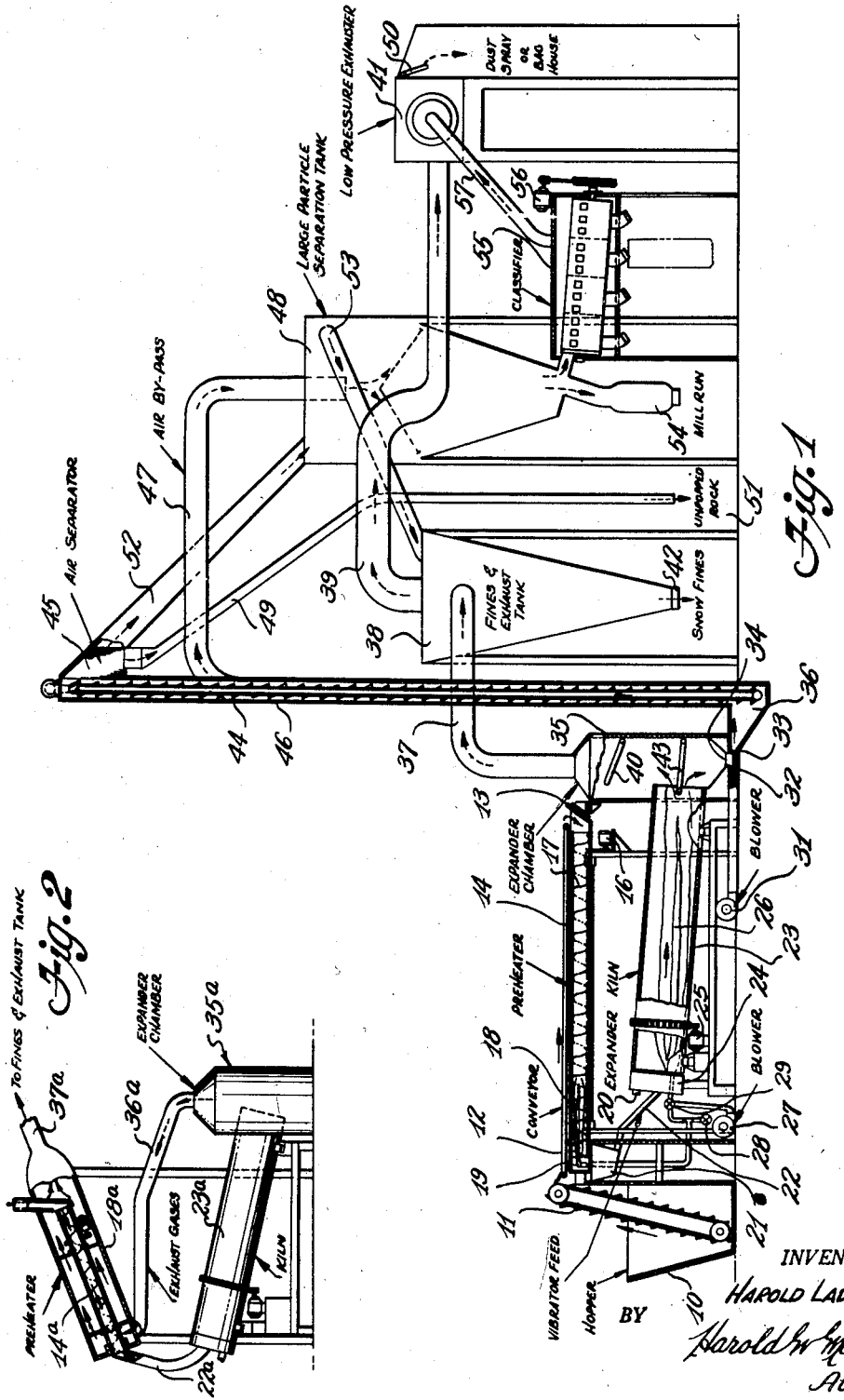
INVENTOR.
HAROLD LADD PIERCE
BY
Harold W. Mattingly
Attorney March 28, 1950 H. L. PIERCE 2,501,962
PROCESS FOR EXPANDING EARTH MATERIALS
Filed May 16, 1947 2 Sheets-Sheet 2

INVENTOR.
HAROLD LADD PIERCE
BY
Harold W. Mattingly
Attorney

Patented Mar. 28, 1950

2,501,962

UNITED STATES PATENT OFFICE 2,501,962

PROCESS FOR EXPANDING EARTH MATERIALS

Harold Ladd Pierce, Pasadena, Calif.

Application May 16, 1947, Serial No. 748,589

8 Claims. (Cl. 252—378)

My invention relates to methods and apparatus for expanding rock or earthy materials having a heat expansive component therein and has particular reference to improvements in the expansion of rock material having water of crystallization.

It is well known that various igneous materials will expand when subjected to carefully controlled heat. For example, certain types of mica may be expanded into a cellular mass and these mica type minerals are generally referred to as vermiculites. The expansible igneous rocks that have the most commercial value at present, however, are the volcanic glass type of rocks of which perlite is the most commonly used form. These volcanic glasses obtain their crystalline form due to the presence of water of crystallization and when these rocks are carefully heated this water of crystallization may be converted to useful vapor that will expand the rock when the rock is in a plastic state due to heat. This perlitic rock is sometimes referred to as perlitic pitchstone and I have found that the types of perlite that have the major portion of their silica content combined as sodium aluminum silicate are the most satisfactory.

The desired expanded rock product is an inert material having a sponge-like structure. When this expanded material is used as a concrete aggregate, it will make light-weight blocks that may be several times lighter than water. In addition to the light-weight obtained by the use of this expanded igneous material, the blocks or other products formed therefrom have an extremely high insulating coefficient. When the expanded material is bonded by cement or plastic into wallboards, it not only produces a light-weight structural and insulating material but a high quality acoustical board is also obtained, particularly when the surface is ground to more fully expose the cellular structure of the expanded granules. Accordingly, therefore, expanded igneous rock has a very high commercial potential and upon the development of reliable and highly efficient production techniques and apparatus this expanded igneous material will be of great commercial value.

This perlitic material has been successfully expanded in laboratory tests or in laboratory type of equipment by the application of steady and continuous heating. The use of a continuous and steady heating cycle, however, has proved entirely impractical for commercial production inasmuch as the control has proved to be too critical. Various special types of furnaces have been developed and elaborate temperature and speed controls have been devised but these have not resulted in commercially acceptable results.

I have found that igneous rocks, particularly perlite, having a water of crystallization may be expanded on a commercial scale without the employment of critical temperatures and speeds. This production improvement is based upon my discovery that the perlite material may be preconditioned by a heat treating process so that when the conditioned perlitic rock is subjected to heat of a proper temperature and duration to cause expansion, the expansion will be uniform and thorough, resulting in high quality expanded material that is relatively free of unexpanded particles. This conditioning treatment I prefer to refer to as "pre-heating." This is a slight misnomer, however, inasmuch as the conditioned rock may be permitted to completely cool in between the conditioning and the expanding steps if this is necessary or desirable. I prefer, however, to expand the rock while it is still hot from the pre-heating or conditioning operation.

I am not certain as to the exact changes effected by my pre-heating process. There appears to be, however, some changes effected in the water of crystallization so that it may be readily available upon the application of the intense heat generally employed for the expanding operation. This is in contrast to untreated perlitic rock which is exposed to intense expanding heat wherein only the outer shell of the rock particles are affected, the interior remaining substantially unexpanded. The pre-heating may take place at a relatively low temperature compared to the expanding temperature; for example, this pre-heating may be in the temperature range from 600 to 1200° F. This is in contrast to the expansion temperature range which may be from 1500 to 2000° F. There is a slight weight loss during the pre-heating operation but this appears to be incidental and is probably due to the vaporization of some of the water of crystallization on the exterior of the rock particles. This weight loss appears to be on the order of one-half to two per cent for the average pre-heating run. As mentioned, however, this is an incident of the pre-heating operation and although it could be used as a control for the pre-heating it is much more satisfactory to use time and temperature factors obtained empirically for the particular type of perlitic rock being processed. If the preheat is properly performed there should not be any expansion of the rock material. The preheat effect, however, appears to be a permanent one and not merely a temporary effect. The pre-heating tends to change the color of certain perlite rocks to a lighter shade, and perhaps sets up internal stresses in the molecular structure, which stresses assist in the subsequent expansion.

The amount of heating in both the pre-heating operation and the expanding operation is dependent not only on particle size but on the type or quality of the perlitic rock being processed. Although two different types of perlitic rock may appear to have the same chemical composition and internal structure, they nevertheless should be subjected to test runs to determine the exact duration of time with specific temperatures for the process runs. This is not a severe operational drawback, however, inasmuch as it is customary to obtain the rock material from a single locality and under these circumstances the rock is likely to be uniform in type or texture.

It is therefore an object of my invention to provide improved methods for the production of expanded earth materials.

Another object of my invention is to provide improved methods for the expansion of rock having water of crystallization.

A further object of my invention is to provide improved methods for the expanding of volcanic glass rocks, particularly perlitic rocks.

Another object of my invention is to provide improved apparatus for the expansion of earth materials including pre-heaters and expander heaters that are separate units in the apparatus.

Another object of my invention is to provide expanding apparatus for rock materials that is free of dust and thus does not give rise to an occupational hazard.

Another object of my invention is to provide various forms of pre-heaters for expanding apparatus including direct heat, indirect heat and flame jet heat.

Still another object of my invention is to provide expanding apparatus that has self-contained expander, de-duster and classifier units.

Other objects and advantages of my invention will be apparent from a study of the following specifications, read in connection with the accompanying drawings, wherein Fig. 1 is a diagrammatic layout for an expanding plant employing the principles of my invention, including a separate pre-heater as well as an enclosed dust-free system of classifiers;

Fig. 2 is a diagrammatic illustration of a modified form of one part of the expanding plant of Fig. 1, embodying the use of indirect re-cycled heat for performing the pre-heat operation; and Fig. 3 is a diagrammatic plant lay-out for a high capacity production plant for expanded volcanic glass materials utilizing the flame jets as heating agents for the finer particles.

Referring to Fig. 1, crushed rock material may be fed into a hopper 10, from which it may be elevated by a bucket belt 11 to a conveyor belt 12 that will deliver the material to a scoop 13 located at the inlet end of a rotatable tube 14 which serves as a pre-heater. The tube 14 may be rotated by a drive from a motor 16 and, although the tube may be inclined to advance the material therethrough, this advance of material may also be obtained by the employment of a helical rib 17 secured to the interior of the tube. A flame 18 obtained from a suitable valve or nozzle 19 may act as the heat source for the pre-heater and gas or oil have both been successfully used as fuels.

The pre-heated material may be dropped into a hopper 21 and a vibrator feed 22 located at the bottom thereof may deliver the material at a regulated rate to an expander kiln 23 after passing through a heated stationary end wall 24. The expander kiln 23 is preferably rotary and may be driven by a motor 25.

I have found that the type of heat supplied to the expander kiln is extremely important inasmuch as the expansion cycle has a time duration preferably in the range of from one to five seconds. This is in contrast to the pre-heat time which may be in a matter of minutes; for example, from one-half to ten minutes. Additionally, the type of flame is highly important inasmuch as exceedingly high temperature must be obtained in this kiln; for example, the range noted previously of 1500 to 2000° F. For this reason it is important that the material not only be exposed to the heat of the flame but should also pass through portions of the flame if possible.

I have accordingly devised a means of propagating a long flame 26 for the kiln 23 and in passing it should be noted that I have successfully used expander kilns of twelve feet in length. The primary or pre-mixed air may be obtained from a blower 27 and the fuel itself, either gaseous or liquid, may be supplied through a valve 28. The fuel and primary air may be mixed at a mixing valve 29. This pre-mixed air is insufficient to supply the entire combustion requirements of the fuel and this factor is desired not only to prevent flare-backs to the mixing valve 29 but also has proved highly desirable in the propagating of the long flame 26.

Another important factor in the propagation of the flame is the use of the hot end wall 24 which is especially designed to become hot throughout so that the rock material vibrated therethrough may absorb a slight amount of heat and especially so that the gas emerging thereat may have a hot surface immediately adjacent to the point of emergence. This hot surface for the fuel results in the propagation of the flame immediately at the hot wall 24 and in this connection the wall 24 may be internally recessed to be cup-shaped. The materials delivered by the vibrator 22 at one side of the flames will drop into a hot kiln as compared to common types of kilns using burners wherein the flame starts at a substantial distance from the nozzle or outlet of the gas. The raw rock cools the flame when tumbled into the flames by the kiln and if the flames were not strong at this point this cooling effect would be deleterious.

The finer particles and dust will be passed through the kiln 26 by the high velocity air and flame passing therethrough. The heavier particles will drop to the kiln to be tumbled therethrough due to the incline of the kiln. The lighter particles will naturally pass through the kiln faster than the tumbled particles but inasmuch as they are smaller this automatically regulates the time period according to the size of the particles. The regulation of the primary air is also important in the timing of the expansion cycle and is supplemented by a secondary air and this secondary air is sucked through the spaces between the stationary head and the end of the kiln, or through adjustable vents in the head 24, and mixes with the flame to supply the remaining combustion requirements of the flame. This primary to secondary air ratio is important in propagating the long flame and I have found that a ratio of five parts of primary air to three parts of secondary air is quite satisfactory although there could be variations from this figure which is generally approximate. For example, in my kiln length of twelve feet I have successfully employed three balanced long-flame gas or oil burners consuming 900 cubic feet of natural gas or its equivalent per hour, together with 5500 cubic feet of positive air or primary air and approximately 3500 cubic feet of auxiliary or secondary air. It should be noted that there is approximately a one to seven expansion of the air due to heating while passing through the kiln 23. For natural gas I have found that a ratio of one part gas to ten parts total air is satisfactory for complete combustion. For liquid fuels, a steam jet may be desirable for propagating a long flame.

The secondary air may be obtained in any suitable fashion but I have found that employment of a venturi to create a sucking action at the outlet end of expander kiln 23 is the most satisfactory way to obtain this secondary air. Accordingly, a blower 31 may be provided with blasts of air through a restricted tube 32 located in a larger tube 33. The larger tube 33 may have an opening 34 therein disposed at the bottom portion of an expanding chamber 35, into which the expanded but hot and plastic perlite is delivered. The air from the blower 31 creates a Venturi action at the outlet of the small tube 32, sucking air through the expander chamber bottom port 34 into a conveyor housing 36. This sucking of air also causes the expanded perlite to move with it and when the expanded perlite strikes the jet of air from the Venturi tube 32 it cools the perlite, causing it to assume a hard non-plastic state so that it may thereafter be handled without fear of compressing or deforming the expanded granules.

The expander chamber 35 not only acts to receive the heavier expanded particles, and thereby begin cooling of these particles even before they strike the venturi, but also serves as a collector or conduit for the fine particles or dust. Accordingly, therefore, the hot gases from the kiln 23 are divided into two portions, the major portion passing upwardly into the expander chamber 35 and thence through a pipe or other conduit 37 into a settling tank 38, preferably in the form of an elongated cyclone chamber wherein the blast of air may be spiraled for a large number of turns before it is removed therefrom by an exhaust conduit 39 connected to a low pressure high capacity exhaust blower or fan 41. During the spiraling action in the cyclone 38 the heavier fines are precipitated by gravity and these may be collected at the bottom thereof by means of a suitable valve or closure mechanism 42. The separation of the gases at the outlet end of the expander kiln 23 may be aided by the use of a divider damper 40 which may regulate the proportions of the air going upwardly and downwardly in the expander chamber 35.

The heavier particles, as previously mentioned, are blown into the bottom of a conveyor housing 36 wherein may operate a bucket belt 44 or other suitable elevator and terminating at its upper end in an air separator 45. The blast of air from the Venturi blower 31 travels upwardly in a housing 46 disposed about the conveyor 44 and may assist to some degree in initiating the upward movement of the particles within the housing 46. An air by-pass 47 may be provided at the upper end of the elevator housing 46 so as to pass the major portion of the air, together with any light particles that may travel therein, into a large particle separation tank 48. The air separator 45 is designed to utilize air from the Venturi blower 31 but may use air from any other source so as to separate the kiln products into the high density unpopped material and country rock associated therewith and into the lighter expanded particles. The heavier particles pass through a conduit 49 connected to the bottom of the separator to a bin 51 where they may be removed. The lighter expanded material may pass through a conduit 52 into the large particle separation tank 48. A connection is made by means of a conduit 53 between the large particle tank 48 and the fines cyclone 38 so as to remove the air from this tank together with the fines and dust that may not have been separated at the expander chamber 35 or which may be subsequently formed.

The large particles collected in the tank 48 may be used directly by taking them off in a mill run outlet 54 or they may be classified according to size in a classifier 55. Although a trommel or perforated cylinder is shown as a classifier, it is obvious that any other type may be used and it will be obvious that any degree of classification may be obtained. A motor 56 may drive the classifier. An exhaust conduit 57 leading to the exhaust blower 41 may remove dust from the classifier.

The air that is blown out the outlet of the low pressure exhauster 41 will carry with it the dust that is too fine to settle out in the cyclone 38. Although this dust could be exhausted out of the tall chimney to avoid local concentrations that might be a health hazard, I have found that this material may be easily disposed of by passing it through a spray chamber wherein the fine dust particles are collected on droplets of water. Alternatively, the dust may be collected in bags of fine weave fabric that will withstand the high temperature; for example, asbestos cloth or fiber glass bags. This dust thus collected may be used commercially as fillers for paint or paper or may be used as a fine abrasive in a fashion similar to pumice.

The relative capacities of the various blowers and the size of the conduits and the tanks associated therewith are so adjusted that the major part of the entire plant air system is under a sub-atmospheric or negative pressure. This negative or sub-atmospheric pressure may be on the order of a few ounces and I have found that a half pound of pressure below atmospheric is entirely satisfactory for dust control. At any leaks in the entire system such as are necessary at rotating joints or power drives, air will be sucked into the system rather than dust blown out of the system. This not only conserves the dust which has a commercial value, as just mentioned, but also results in a clean atmosphere throughout the entire plant so that the health of workmen operating the plant is not impaired from this standpoint. I prefer, however, to make the large particle separation tank 48 operate at a positive pressure which may be on the order of one or two pounds above atmospheric pressure. This tank accordingly may have the joints with the conduits carefully sealed so that any dust will not be blown outwardly therefrom. In this connection it will be noted that the conduit 53 to the cyclone 38 will remove the air just fast enough from this tank so that this pressure may be maintained. This positive pressure is desirable in the large particle tank 48 to prevent an undue load on the low pressure exhauster 41 which would occur when the outlet 54 of this tank is operated for the release of expanded material. Also the classifier 55 is under a positive pressure and this positive pressure seems to be desirable for the same reason.

While the system of Fig. 1 may be manually controlled, I prefer to incorporate automatic temperature and air flow controls that will make the entire system automatic as far as the maintenance of the desired temperature range is concerned. For example, at present I prefer to standardize on an expanded perlite product having a weight of ten pounds per cubic foot with variations therefrom of plus or minus one pound. This material has been obtained by utilizing automatic temperature controls that maintain the temperature within 25° F. of a preselected standard.

The most efficient type of temperature control preferably combines a fuel control with the air flow control so that greater or lesser amounts of fuel and the combustion air may be precisely regulated so as to maintain the desired sub-atmospheric pressure throughout the major portion of the system. Accordingly an optical pyrometer of the photoelectric responsive type may be disposed on the stationary head 24 and may be focused upon the central part of the kiln so as to optically record the maximum temperature in the kiln. This pyrometer may be electrically interconnected with the mixing valve 29 so as to vary the amount of fuel and primary air passed into the kiln. The pyrometer likewise may control the dampers 50 and 40 as well as the adjustable vents for the secondary air. In this fashion a complete control of the pressure and temperature may be obtained throughout the entire system. I find it desirable, however, to supplement the pyrometer 20 by a thermocouple secured on the end of a rod 43 projecting into the expander chamber 35 near the end of the kiln 23 and this thermocouple may be electrically connected to the control system in the same fashion as the electrically responsive optical pyrometer.

The temperature controls accordingly will reduce the amount of fuel and primary and secondary air when the kiln is too hot, maintaining in general a five by three ratio between primary and secondary air. Likewise if the kiln becomes too cold, the amount of fuel and combustion air will be increased.

Pressure control could be obtained with variable speed blowers in preference to the dampers but I find that the dampers are preferable in ease of regulation.

In connection with the control of the system, it should be noted that the faster that the raw rock is processed the heavier will be the expanded product and the slower it is processed the lighter will be the expanded product. However, slower processing means higher temperatures with the accompanying dangers of clinkering the material in the plastic state and for this reason the upper limits specified for slow processing should not be exceeded for desirable commercial results.

Shown in Fig. 2 is a modification of the preheater stage of the plant of Fig. 1 wherein the pre-heating is done indirectly. Accordingly, a rotatable tube 14a may be surrounded by a housing 18a of much greater diameter than the tube and the exhaust gases from an expansion chamber 35a may lead upwardly through a pipe 36a to this large diameter housing. These hot gases accordingly pass through the housing 18a and transfer their heat to the rotatable tube 14a through which rock material may pass and these hot gases together with the fines and dust may pass through the outlet 37a to a cyclone separator or other device as described. The preheated material may pass through a conduit 22a into an expanding kiln 23a, the heavier particles being transported in any desired fashion; for example, as described in connection with Fig. 1.

The use of an indirect heat gives a slightly more satisfactory result since a direct flame is so intensely hot that particles contacting it are likely to have their outer surfaces heated to a higher than desirable temperature. Also the indirect pre-heater of Fig. 2 conserves some of the heat which would otherwise go to waste.

The duration of the pre-heating and the expanding heating cycles of any type of apparatus employing my invention are dependent as previously mentioned on the quality of rock being processed, the size of particles and the temperatures employed. Accordingly, therefore, no definite time schedule can be laid down. Relative to the temperature, however, it is desirable that the pre-heating temperatures be less than 1500° F. and that the expanding temperatures be in excess of this. By pre-heating for short time periods and by expanding for relatively long periods, substantially the same temperatures could be employed but this is not a satisfactory or desirable commercial practice. By way of illustration, I have successfully used a pre-heating cycle extending in time from one minute to five minutes with temperatures in the range from 600 to 1200° F. when the particles were of a size sufficient to pass an 8-mesh screen and incapable of passing a 20-mesh screen. In general, the longer the duration of the pre-heating cycle, the lower the temperature at which it may be run. However, various qualities of rock must be considered in this connection. For this same size of original rock particles with the pre-heating treatment just described, an expanding cycle of from one to five seconds has been satisfactorily employed with temperatures in the range from 1500 to 2000° F. The resultant end product is approximately ten pounds per cubic foot in weight and I have found it desirable to classify this material into six finished grades or sizes. The upper limit of commercially useful expanding temperatures is approximately 2200° F.

The pre-heater tube 14 of Fig. 1 may be lined so that iron scale will not mix with the material and the rotary kiln 23 is preferably lined with a fairly heavy thickness of brick so that there should not be a high degree of heat loss from the flame passing therethrough.

The velocity of the air at the venturi may be approximately 2500 feet per second while the velocity of travel of the air carrying the fines and dust may be on the order of 1500 feet per second. The whole plant may have its air balance maintained by varying the amount of primary air from the blower 27, the volume of the gas or other fuel, the pressure of the gas or other fuel, by varying the amount of auxiliary air permitted to enter the kiln, as well as by operating the dampers as at 40, the size of the expander chamber opening 34, and by operation of a damper 50 at the exhaust blower 41.

I have illustrated in Fig. 3 a high capacity commercial machine which differs from that of Fig. 1 primarily in the use of separate flame jets as a preheating and expanding medium for the snow fines and dust particles. In this high capacity plant raw rock may be delivered to a crusher 60, from whence an elevator 61 may deliver it into a trommel 62 or other classifier to permit the material to fall into various raw stock bins 63. A selected type of classified rock or any mixture thereof may be fed through a control chute 64 to a second elevator 65 which will deliver it into the top of a raw stock hopper 66, the outlet of which may be controlled to supply this classified raw rock to a short conveyor 67, which in turn may deliver it to a belt screen 68 which will permit the dust and small fines to drop therethrough into a pipe 69. The larger particles may travel down a conveyor 71 to the inlet of a rotary kiln pre-heater 72 which may deliver its output to an expanding rotary kiln 73. The delivery from the pre-heater to the expander may take place by a suitable pipe 74 and it will be noted that the outlet end of this pipe may be disposed at a stationary head on the expander kiln a foot or two ahead of the fuel inlet nozzle so as to contact the hot part of the flame. This prevents the pre-heated material from unduly cooling the flame as would be the case if it struck near the base of the flame.

The dust and fines may pass downwardly through the tube 69 to screw feed pre-heater 70, having a steam jacket thereabout, thence to a jet housing 75, through which high temperature and high velocity steam may be passed by means of a steam nozzle 76. This steam is preferably superheated, for example, to 600° F., and will catch the dust and small fines and blow them upwardly into a furnace chamber 77 in which may be located a plurality of flame nozzles 78 having upwardly inclined outlets. The dust particles accordingly may be swirled about in this chamber by these upwardly inclined and somewhat intersecting flame jets so that a sufficient period of time elapses to effect pre-heating and expanding in this single chamber. The furnace is preferably water-cooled to prevent the fines from sticking thereto and may be designed as a boiler for the steam requirements. Accordingly, the expanded dust and fines may be delivered into a tall thin cyclone 79 for separation of the heavier fines, thence into a second cyclone 81 for separation of the lighter fines and thence into a dust collector 82 which may be of the bag-house type or water chamber as previously mentioned. A suitable blower 83 may be located between the second cyclone 81 and the collector 82 so as to provide not only a passage of gas through this fines treating apparatus but also provides a somewhat sub-atmospheric pressure which greatly aids in the expanding as well as the elimination of dust. Various pipes and conduits may be suitably damped or valved to give precise control of pressure and velocity.

The larger particles will be expanded in the expander kiln 73 and may be delivered into an expander chamber 84 which may have a baffle 85 disposed therein to give the hot gases from the kiln 73 a turbulence that will settle out the heavier particles. These heavier particles may be collected at the bottom of the chamber 84 and may be carried off by a suitable conveyor 86. This conveyor may be in the form of a Venturi jet as described in connection with Fig. 1 or may be merely a mechanical conveyor of any suitable type.

The lighter products of the expander kiln 73 may travel upwardly through a conduit 87 to a first cyclone 88 and after settling of the heavier components of these particles the hot gases carrying the remaining expanded particles may travel through a conduit 89 to a second cyclone 91 and thence to a classifier 92. The heavier particles taken out at the bottom of the expander chamber 84 may be dumped into the classifier 92 by means of an elevator 93 having an outlet 94.

A separate elevator (not shown) or air jet may deliver any selected fines fom any of the cyclones into a delivery tube 96 located near the classifier 92 to feed thin fines into a hopper 97. An exhaust fan 98 may be provided to remove dust from the classifier 92 as well as to maintain air circulation through the cyclones 88 and 91. This dust filled air, if desired, may be delivered to the dust collector 82 by any suitable means such as a conduit.

The apparatus of Fig. 3 also includes the feature of a ready mix apparatus so that the classified material may be mixed in any suitable proportions with cement or plaster so that it may be transported in a dry mix condition in sacks or ready mix trucks to any particular job or other cement consuming product such as a cement block plant. Accordingly, an elevator 95 from a cement silo may deliver cement to a mixer 99 maintained at a sufficiently high level so that a truck may be moved under the mixer to receive the aggregate and cement mixture while still moist.

In general, the operation of the plant of Fig. 3 is similar to that of Fig. 1 except that the dust and fines are separated before pre-heating and these are separately heat treated by means of flame jets. Dust free operation is assured by operation at a slightly sub-atmospheric pressure and air balance may be obtained in the same general fashion.

While I have described my methods and apparatus as applicable primarily to perlite, it will be apparent that various types of expansible rock could be used therein. For example, some forms of pumice or volcanic ash are only partly expanded and accordingly these may be pre-heated and expanded in the same fashion as the original volcanic glass. Also earth materials containing fusible clays may be expanded upon heating in accordance with my invention. For example, clay and silica may be pelleted by mixing water and oil therewith and these pellets may be heated to the calcining temperature of limestone. This will liberate gas and oxygen and the high temperature will cause the limestone and clay materials to fuse into a plastic mass, effecting an expanded rock particle having the same general character of usefulness as expanded perlite. Also borax may be mixed with various types of expansible earth materials, particularly at the later stages of expansion, and the borax will tend to fuse a glazing upon the outer surface of the expanded particles. This will give a sealed up expanded particle that will absorb a minimum amount of moisture and gas.

Likewise common salt thrown on hot expanded material or mixed during or prior to the heating operation will effect a similar glaze.

My invention when applied to perlitic materials results in a fine textured expanded product that is fairly resistant to fracture. There are no inherent stresses when the material is properly cooled as by the use of an expander chamber. Also the tumbling of the heavier particles in the expander kiln for the proper length of time will result in rounding the cellular form because of its plastic nature at these temperatures. It will therefore give particles that have the greatest inherent strength and which may be most easily graded, and provide easy flowing concrete mixes with minimum amount of water to obtain high strength and minimum weight. All sizes of particles, however, are extremely useful. For example, the snow fines which have weights as low as one and a half to four pounds per cubic foot may be very successfully employed as an aggregate for a light-weight plaster. This not only saves expense in hauling but also is easier to handle by the workmen applying plaster. The dust is automatically separated according to size and these dust particles may be on the order of several microns. This dust accordingly may be used directly as a filler material or an abrasive or other use as desired.

The use of a long flame in the expander kiln not only assures the greatest uniformity of heating but also avoids sticking inasmuch as the temperature throughout the kiln is uniform and devoid of "hot spots." The absence of hot spots eliminates local regions of intense heat that cause excessive plasticity of the material and thereby prevents the material from sticking to the kiln or one particle sticking to another particle. While the pre-heated particles may be cooled in between pre-heating and expansion, it is commonly more successful to use them while hot inasmuch as there is less cooling of the expanding flame. Also for the same reason it may be desirable to pre-heat the air used in the combustion forming the expanding flame or flames, and also to reduce fuel costs.

While I realize that no exact limits have been stated herein for the pre-heating cycle, it will be appreciated by the workers in this art, as has been explained, that variations in quality and type of crystallized material will require wide variations in operating times and temperatures. While the pre-heating operation may be defined in terms of loss of weight during pre-heating or absence of expansion or various other ways, I find that from a commercial standpoint it is much more satisfactory to laboratory test the material for the required time and temperature cycle that will produce reliable expansion. Also as previously mentioned I do not know the exact nature of the internal change effected by this pre-heating and accordingly cannot define my invention in terms of the effect on the internal structure of the crystal.

While various types of apparatus may be employed in carrying out my method or methods, I find that the use of separate pre-heaters and expanders are more satisfactory than the maintenance of two temperature zones in a single furnace; for example, a rotary kiln. Likewise I find that the use of a long flame in an expander furnace, that is, a flame which extends substantially the entire length of the path of the material through the expander surface, is of great value. This in turn is dependent not only on the careful proportioning of primary and secondary air but also upon the use of a "hot wall" at the fuel inlet to the furnace. The use of negative or sub-atmospheric pressures in the elimination of dust is very important for the protection of employees as well as the recovery of commercially valuable dust.

Various modifications, however, may be made in my methods and apparatus without departing from the true spirit and scope of my invention. For example, reverse feed of kilns may be used, especially for the heavier grades, that is, material flow in opposition to flame direction. Accordingly I do not limit myself to the specific embodiments described.

I claim:

1. A two-step process for expanding perlite comprising the step of pre-heating perlite in a first zone maintained at a temperature and for a period of time sufficient to remove a portion of the combined water from said perlite, but insufficient to cause any apparent expansion thereof, and then introducing said pre-heated perlite into a second zone maintained at an expanding temperature to expand the perlite.

2. A two-step process for expanding perlite comprising the step of pre-heating perlite in a first zone maintained at a temperature between 600° F. and 1200° F. and for a period of time sufficient to remove a portion of the combined water from said perlite, but insufficient to cause any apparent expansion thereof, and then introducing said pre-heated perlite into a second zone maintained at an expanding temperature to expand the perlite.

3. A two-step process for expanding perlite comprising the step of pre-heating perlite in a first zone maintained at a temperature and for a period of time ranging from one to five minutes and sufficient to remove a portion of the combined water from said perlite, but insufficient to cause any apparent expansion thereof, and then introducing said pre-heated perlite into a second zone maintained at an expanding temperature to expand the perlite.

4. A two-step process for expanding perlite comprising the step of pre-heating perlite in a first zone maintained at a temperature between 600° F. and 1200° F. and for a period of time ranging from one to five minutes and sufficient to remove a portion of the combined water from said perlite, but insufficient to cause any apparent expansion thereof, and then introducing said pre-heated perlite into a second zone maintained at an expanding temperature to expand the perlite.

5. A two-step process for expanding perlite comprising the step of pre-heating perlite in a first zone maintained at a temperature and for a period of time sufficient to remove a portion of the combined water from said perlite, but insufficient to cause any apparent expansion thereof, and then introducing said pre-heated perlite into a second zone maintained at a temperature ranging from 1500° F. to 2200° F. for a period of time sufficient to expand the perlite.

6. A two-step process for expanding perlite comprising the step of pre-heating perlite in a first zone maintained at a temperature between 600° F. and 1200° F. and for a period of time sufficient to remove a portion of the combined water from said perlite, but insufficient to cause any apparent expansion thereof, and then introducing said pre-heated perlite into a second zone maintained at a temperature ranging from 1500° F. to 2200° F. for a period of time sufficient to expand the perlite.

7. A two-step process for expanding perlite comprising the step of pre-heating perlite in a first zone maintained at a temperature between 600° F. and 1200° F. and for a period of time ranging from one to five minutes and sufficient to remove a portion of the combined water from said perlite, but insufficient to cause any apparent expansion thereof, and then introducing said pre-heated perlite into a second zone maintained at a temperature ranging from 1500° F. to 2200° F. for a period of time sufficient to expand the perlite.

8. A two-step process for expanding perlite comprising the step of pre-heating perlite in a first zone maintained at a temperature between 600° F. and 1200° F. and for a period of time ranging from one to five minutes and sufficient to remove a portion of the combined water from said perlite, but insufficient to cause any apparent expansion thereof, and then introducing said pre-heated perlite into a second zone maintained at a temperature ranging from 1500° F. to 2200° F. and for a period of time ranging from one to five seconds for expanding the perlite.

HAROLD LADD PIERCE.

REFERENCES CITED

The following references are of record in the file of this patent:

UNITED STATES PATENTS

| Number | Name | Date |
|---|---|---|
| 284,178 | Browne | Sept. 4, 1883 |
| 729,009 | Sutton et al. | May 26, 1903 |
| 920,333 | Hughes | May 4, 1909 |
| 1,238,394 | Eldred | Aug. 28, 1917 |
| 1,704,483 | Lindsay | Mar. 5, 1929 |
| 1,961,311 | Uhle et al. | June 5, 1934 |
| 1,963,275 | Labus | June 19, 1934 |
| 1,992,669 | Labus | Feb. 26, 1935 |
| 2,265,358 | Denning | Dec. 9, 1941 |
| 2,306,462 | Moorman | Dec. 29, 1942 |
| 2,424,330 | Robertson | July 22, 1947 |

OTHER REFERENCES

Kôzu: in Science Report, Tohoku Imperial University (1929), Series 3, vol. 3, page 231.